Dec. 29, 1942. W. A. BEDFORD, JR 2,306,928
ROTARY FASTENER DEVICE AND INSTALLATION OF THE SAME
Filed Nov. 26, 1941
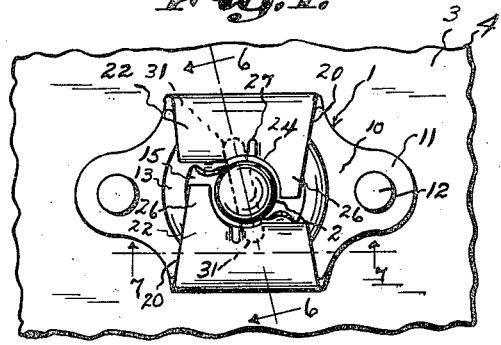
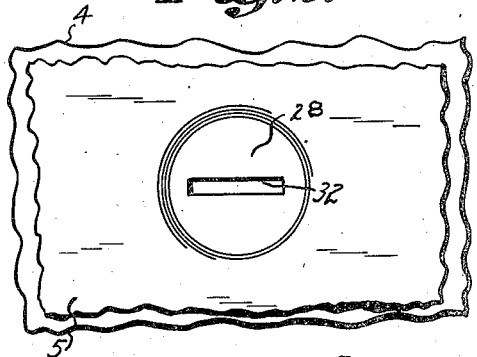
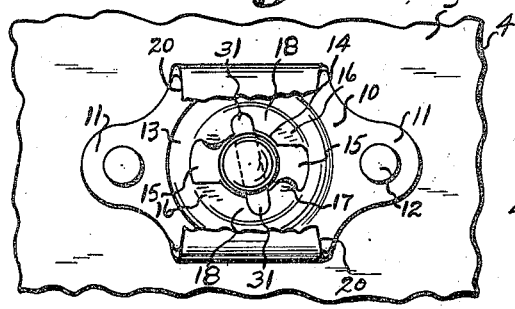
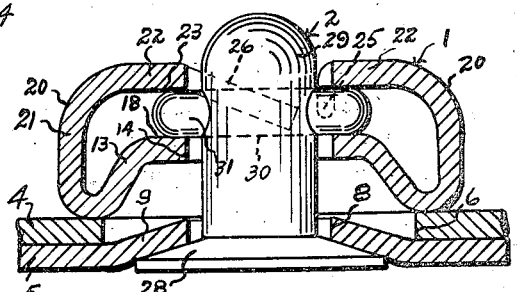
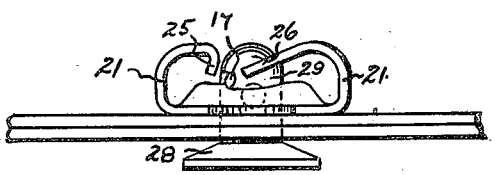
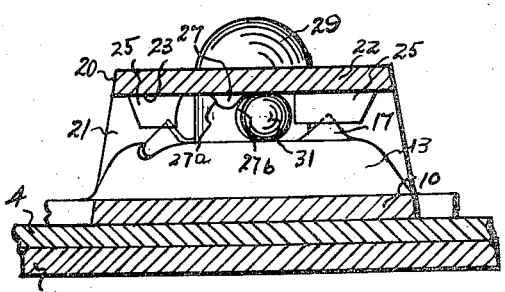
Inventor:
William A. Bedford Jr.
by John Todd Att'y.

Patented Dec. 29, 1942

2,306,928

UNITED STATES PATENT OFFICE 2,306,928

ROTARY FASTENER DEVICE AND INSTALLATION OF THE SAME

William A. Bedford, Jr., Hingham, Mass., assignor to United-Carr Fastener Corporation, Cambridge, Mass., a corporation of Massachusetts Application November 26, 1941, Serial No. 420,554

16 Claims. (Cl. 24—221)

This invention aims to provide improvements in fastener devices in securing together two or more members preferably plate-like. The device being of the so-called rotary operative type and adapted to draw the plates together on rotation of one part of the device relative to the other.

The chief object is the provision of a fastener device of simple and inexpensive construction having an improved socket member formed from a relatively small piece of sheet metal material and being adapted to cooperate with a stud member in a manner to draw the parts to be secured firmly together. The socket member is of that type now coming into common use in connection with high speed aircraft, and provides a support for a lateral projection of the stud member which is rigid enough to prevent any appreciable movement of the plates away from each other flatwise, while allowing for seasonable manufacturing tolerances. The socket member provides resilient portions of novel construction which cooperate with the lateral projections of the stud member when the stud is turned to locking position to hold the projections in locked engagement with the socket member.

Other uses and objects of my invention will be apparent from inspection of the drawing and specification hereinbelow set forth.

In the drawing which illustrates preferred embodiments of my invention:

Fig. 1 is a top plan view showing an installation including two plate members secured together by means of my improved fastener device;

Fig. 2 is a rear view of the installation shown in Fig. 1;

Fig. 3 is a side elevation of the socket member of the fastener device secured in assembly with one of the plates to be secured together;

Fig. 4 is a view of the installation shown in Fig. 1 looking from the right of Fig. 1;

Fig. 5 is a view similar to Fig. 1 with portions of the socket unit broken away to show more clearly the base element of the socket;

Fig. 6 is an enlarged section taken along the line 6—6 of Fig. 1;

Fig. 7 is an enlarged section taken along the line 7—7 of Fig. 1;

Fig. 8 is a view similar to Fig. 4 and showing the manner in which elements of the socket member operate to eject automatically the lateral projections of the socket member; and Fig. 9 is a top plan view of a modified form of fastener device.

Referring to the drawing the preferred fastener device comprises a socket unit 1 and a rotary unit 2. The socket unit 1 is secured on an inner surface 3 of a flat supporting plate 4 and the rotary unit 2 is carried by a flat supporting plate 5. The plate 4 has an aperture 6 (Fig. 6) adapted to receive a portion of the stud unit 2, and the plate 5 has an opening 8 through which the stud unit 2 projects. The opening 8 is preferably surrounded by a frusto-conical embossment 9 (Fig. 6) so that the plate 5 will receive the same when the plates are in flush abutting relation.

Referring in detail to the construction of the socket unit 1, the member is preferably constructed of a single piece of spring metal. The socket in the preferred form has an elongated base element 10 providing end portions 11 which are preferably narrower than the main body of the base so as to reduce the weight of the fastener to a minimum. In the preferred installation the base 10 is bowed longitudinally, as illustrated in Fig. 3, to take up a variance of a few thousandths in the combined thicknesses of the plates to be secured together. Each of the end portions 11 has a rivet 12 extending through the base and the plate 4 so as to secure the base permanently to the plate 4. The base 10 has a central raised portion or embossment 13 providing an outer face having a main opening 14 and lateral extensions 15 of the main opening on opposed sides thereof. Locking surfaces which are preferably of arcuate form are provided on opposed sides of the opening 14. Each of the locking surfaces extends from a downwardly bent lip or cam element 16 (Fig. 5) adjacent one of the extensions 15 to a bent up stop lug 17 adjacent the other of the extensions 15. A flat surface 18 (Figs. 5 and 6) is provided as a part of each of the locking surfaces and disposed intermediate its respective cam element 16 and lug 17. The purpose of the lugs 17 is to control movement of elements of the stud unit in unlocking the parts of the device, as will be described.

Locking means which engage the stud unit to hold the same in locking engagement with the socket member are formed as an integral part of the socket unit. The locking means in my present invention is in the form of a pair of wings 20—20 which are integrally joined to longitudinal edges of the base 10 by bight portions 21. Each of the wings has a free end portion 22 and the portions 22 extend toward each other in directions transverse to the length of the base 10. The end portions 22 provide broad lower surfaces 23 (Figs. 6 and 7) in superposed facing relation to at least portions of the locking surfaces. Each of the end portions 22 has a crescent-shaped opening 24 in its outermost free edge to receive an element of the stud unit.

A stop ear 25 forms an extension of the free edge of each of the end portions 22 on one side of the crescent-shaped opening 24. The ears 25 extend downwardly in the direction of the embossment 13 and operate to limit rotation of the stud unit in a locking direction. A finger-like element 26 forms an extension of the free edge of each of the end portions 22 on an opposite side of the opening 24 from the ear 25. Each of the fingers 26 projects downwardly toward the embossment 13 and is disposed in superposed relation to one of the extensions 15. The finger elements 26 operate to eject automatically the stud unit from the socket unit when the stud is turned to unlocked position, as will be described. A cam or fastener element 27 is formed in each of the end portions 22 adjacent the free edge of the respective wing portion and intermediate the ears 25 and fingers 26 thereof. Each of the cam elements 27 is preferably formed by depressing the free edge so as to provide a projection extending in the direction of the embossment 13 and overlying the flat surfaces 17 of the locking surfaces. Each of the cam elements 27 has a rounded surface 27$^a$ on one side and a rounded surface 27$^b$ on the other side thereof, as most clearly shown in Fig. 7, whereby the element acts as a double cam to effect locking and unlocking engagement with the wings 20 in a manner to be more fully described.

The rotary unit 2 comprises a head portion 28 which is larger in diameter than the opening 8 of the plate 5 and a shank 29 which is smaller in diameter than the opening 8 of the plate 5 and the main opening 14 of the base element 10 so as to project through the same. A pin 30 is driven or otherwise secured in an aperture of the shank 29 so that opposite ends 31 of the pin extend laterally beyond the sides of the shank in a direction normally to the axis of the shank. The pin 30, which is preferably of greater length than the diameter of the opening 8 of the plate 5, is assembled with the shank of the stud unit after the shank has been extended through the opening 8 so that the pin operates to hold the stud unit in assembly with the plate 5. The head 28 preferably has a slot 32 (Fig. 2) to receive a tool or suitable implement by which the stud unit may be rotated.

In fastening the plate 5 to the plate 4 the embossment 8 of the plate 5 is disposed within the aperture 6. When the parts are in this relation, the shank 29 extends through the main opening 14 of the base and the pin ends 31 are in registration with the lateral extensions 15. Thereafter, the rotary member is turned in a counterclockwise direction (viewing Fig. 1) causing the pin ends 31 to ride up over the inclined surfaces of the lip elements 16 to engage the flat surfaces 17. During this action the plates 4 and 5 are drawn tightly together and the relation of the combined thicknesses of the plates 4 and 5 to the distance between the pin 30 and the head 28 of the stud unit is preferably such that the base element 10 of the socket member is drawn down flat against the outer surface 3 of the plate 4. As rotation is continued the pins 31 engage the rounded sides 27$^a$ of the cam elements 27, which are normally spaced from the flat surfaces 17 a distance less than the diameter of the pin ends. As a result of this engagement, the pin ends cam the end portions 22 of the wing elements upwardly permitting the pin ends to ride under the projections 27, after which the end portions 22 contract to dispose the rounded surfaces 27$^b$ behind the pin ends to prevent ready rotation of the pin ends in a reverse direction (Fig. 7). It will be seen that the base element 10 in flattened down position provides a rigid support for the pin ends 31 so that no part of the fastener device is yieldable over forces tending to move the plates 4 and 5 away from each other flatwise. Even though the relative dimensions of the parts of the installation should be such that when the pin ends are in locked engagement with the flat surfaces 17, the base 10 has not pulled down into flattened position but retains its bowed form, the socket unit still offers a substantially rigid support for the pin ends as the greatest possible distance of flatwise movement between the plates 4 and 5 can be no greater than the distance between the outer surface 3 of the plate 4 and the adjacent surface of the base 10 of the socket unit. As this distance preferably only amounts to a few thousandths of an inch, no great damage is done should the plates 4 and 5 separate to that extent.

The parts of the fastener device may be unlocked by rotating the stud member in a reverse direction. At the end of the unlocking action automatic ejection of the pin ends from the socket member is provided by reason of the fact that when the pin ends have been turned so as to ride down the lip portions 16 they are engaged by the finger elements 26 of the wings and are forced under the tension of the elements 26 through the lateral extensions 15 to separate completely the stud and socket units. The lugs 18 adjacent the respective lateral extensions 15 operate to insure that the pin ends are not turned by the lateral extensions 15 when the stud unit is turned in an unlocking direction.

Referring to the modified form of fastener illustrated in Fig. 9, this fastener differs from my preferred form of Figs. 1–8 by providing only a single resilient wing element for engaging the pin ends. Thus, referring to Fig. 9, I have shown a slightly different installation including the corner of a supporting plate 33 which provides upwardly extending edges 34. The fastener provides a general triangularly-shaped base element 35 having its apex 36 disposed adjacent the corner of the plate 33. The socket unit is secured to the plate 33 by means of rivets 37 which extend through the base 35 adjacent the ends of that side 38 of the base directly opposite the apex. A raised element or embossment 39 is formed in the base 35 and the embossment has an aperture in its outer end, including a central aperture 40 and lateral extensions 41 of the central aperture. Arcuate locking surfaces are provided adjacent opposite sides of the aperture of the base which are similar in form to the locking surfaces of the first form of socket unit and provide downwardly projecting lips or cams 42 and flat pin-engaging surfaces 43. As a result of the position of the socket unit relative to the edges of the supporting plate it is difficult, if not impossible, to provide a wing element on the side of the socket nearest the corner of the plate 33. For that reason the fastener provides a single wing 44 only which is integrally joined to the side 38 of the base and extends toward the apex 36 in superposed relation to the base. The wing 44 is similar in form to the wings 20 of the first form of socket unit and includes a crescent-shaped opening 45 in its free edge, an ejecting tongue 46 adjacent one side of the opening 45 and overlying the lip 42 of one of the locking surfaces, and a cam projection 47 overlying one of the flat surfaces 43 of the locking surfaces and operating in the manner of the projection 27 of my first form to cooperate with the pin of the stud unit to lock the stud unit in assembly with the socket member. The stud unit used in connection with the second form of socket unit may be identical with the stud unit 2 of the first form of fastener device.

Thus, I have found that where the socket unit is to be secured to the supporting plate at points which do not allow room for both wing elements, an efficient locking device is provided for most uses by employing a single wing element only. The double locking surfaces of the second form provide good support for the pin ends and the single wing element cooperates with the pin to hold the pin ends in locked position against ready rotation in an unlocking direction.

Although I have illustrated and described preferred embodiments of my invention, I do not wish to be limited thereby because the scope of my invention is best defined by the following claims.

I claim:

1. In a fastener device of the rotary operative type, a socket unit having a base element adapted to be attached to one of the parts to be fastened, said base element having an aperture and a locking surface adjacent said aperture, a rotary member having a shank adapted to pass through said aperture in said base element and having a portion adapted to engage said locking surface on relative rotation of the parts, and a resilient element integral with said base, said resilient element having a surface in superposed facing relation to said base and movable relative to said base, and said resilient element having a fastener element extending out of the plane of said surface in the direction of said base and cooperating with said rotary member to maintain it in fastener engagement with said socket unit.

2. In a fastener device of the rotary operative type, a socket unit having a base element adapted to be attached to one of the parts to be fastened, said base element having an aperture and a locking surface adjacent said aperture, a rotary member having a shank adapted to pass through said aperture in said base element and having a lateral projection adapted to engage said locking surface on relative rotation of the parts, and a resilient element integral with said base, said resilient element having a broad surface in superposed facing relation to said base and movable relative to said base, and said resilient element having a fastener element extending out of the plane of said broad surface in the direction of said base, said fastener element having a cam on one side adapted to lift said resilient element when engaged by said projection during rotary movement of said member and said fastener element having an abutment on another side adapted to cooperate with said projection to maintain said projection in fastener engagement with said socket unit.

3. In a fastener device of the rotary operative type, a socket unit having a base element adapted to be attached to one of the parts to be fastened, said base element having an aperture and a locking surface adjacent said aperture, a rotary member having a shank adapted to pass through said aperture in said base element and having a lateral projection adapted to engage said locking surface on relative rotation of the parts, and a resilient element integral with said base, said resilient element having a broad surface in superposed facing relation to said base and movable relative to said base, and said resilient element having a fastener element extending out of the plane of said broad surface in the direction of said base, said fastener element having a cam on opposed sides cooperating with said lateral projection of said rotary member to maintain said lateral projection in fastener engagement with said locking surface.

4. In a fastener device of the rotary operative type, a socket unit having a base element adapted to be attached to one of the parts to be fastened, said base having an aperture and a locking surface adjacent said aperture, a rotary member having a shank adapted to pass through the aperture in said base element and having a lateral projection adapted to engage said locking surface on relative rotation of the parts, a resilient element in superposed relation to said base having means cooperating with said rotary member to maintain said lateral projection in fastener engagement with said socket unit, and said resilient element having a stop element for limiting rotation of said rotary member.

5. In a fastener device of the rotary operative type, a socket unit having a base element adapted to be attached to one of the parts to be fastened, said base having an aperture and a locking surface adjacent said aperture, a rotary member having a shank adapted to pass through the aperture in said base element and having a lateral projection adapted to engage said locking surface on relative rotation of the parts, a resilient element in superposed relation to said base having a cam portion cooperating with said rotary member to maintain said lateral projection in fastener engagement with said socket unit, and said resilient element having a stop portion for limiting rotation of said rotary member, said cam and stop portions cooperating to form a seat therebetween for said lateral projection when said rotary member is turned to locking position.

6. In a fastener device of the rotary operative type, a socket unit having a base element adapted to be attached to one of the parts to be fastened, said base having an aperture and a locking surface adjacent said aperture, a rotary member having a shank adapted to pass through the aperture in said base element and having a lateral projection adapted to engage said locking surface on relative rotation of the parts, and a wing-like resilient element integral with said base, said resilient element having a broad surface in superposed facing relation to said base and movable relative to said base, said resilient element having a cam element adjacent its free end cooperating with said lateral projection during rotation of said member to secure said lateral projection in fastener engagement with said locking surface, and a lug adjacent said free end of said resilient element for limiting rotation of said rotary member.

7. In a fastener device of the rotary operative type, a socket unit having a base element adapted to be attached to one of the parts to be fastened, said base having an aperture and a locking surface adjacent said aperture, a rotary member having a shank adapted to pass through the aperture in said base element and having a lateral projection adapted to engage said locking surface on relative rotation of the parts, and a wing-like resilient element integral with said base, said resilient element having a broad surface in superposed facing relation to said base and movable relative to said base, said resilient element having a cam element adjacent its free end extending toward said base, said cam element being adapted to cooperate with said lateral projection during rotation of said member to secure said lateral projection in fastener engagement with said locking surface, and said resilient element having a stop lug extending from adjacent an edge thereof toward said base, said lug and said cam portion being spaced to receive said lateral projection between them.

8. In a fastener device of the rotary operative type, a socket unit having a base element adapted to be attached to one of the parts to be fastened, said base element having an aperture and a locking surface adjacent said aperture, a rotary member having a shank adapted to pass through said aperture in said base element and having a lateral projection adapted to engage said locking surface on relative rotation of the parts, and a resilient element integral with said base, said resilient element having a broad surface in superposed facing relation to said base and movable relative to said base, said resilient element having fastener means adjacent its free edge adapted to cooperate with said rotary member to maintain said projection in fastener engagement with said socket unit, and a narrow extension of said resilient element integral with said free end of said resilient element and extending in superposed relation to said aperture of said base, said finger being operable to engage said lateral projection when said rotary member is turned to unlocking position to automatically eject said lateral projection through said aperture.

9. In a fastener device of the rotary operative type, a socket unit having a base element adapted to be attached to one of the parts to be fastened, said base having an aperture comprising a main opening and a lateral extension of said main opening, a rotary member having a shank and a lateral projection adapted to pass through said aperture, said lateral projection being adapted to engage said locking surface on relative rotation of said parts, and a wing-like resilient element integral with said base, said resilient element having a cam element adjacent its free edge extending toward said base and spaced a predetermined distance from said locking surface to engage said lateral projection on rotation of said rotary member to hold the same in fastener engagement with said socket unit, and a finger-like element integral with said free end of said wing-like element and disposed in superposed relation to said lateral extension of said aperture, said finger being operable to engage said lateral projection to automatically eject the same through said aperture when said rotary member is turned to unlocking position.

10. In a fastener device of the rotary operative type, a socket unit having a base element adapted to be attached to one of the parts to be fastened, said base element having an aperture and locking surfaces adjacent said aperture, a rotary member having a shank adapted to pass through said aperture in said base element and having lateral projections on opposed sides thereof adapted to engage said locking surfaces on relative rotation of the parts, and resilient elements extending toward each other from opposed sides of said base, each of said resilient elements having a broad surface in superposed facing relation to said base and movable relative to said base, each of said resilient elements having a cam portion projecting out of the plane of said broad surface in the direction of said base and cooperating with said rotary member to maintain said lateral projections of said stud in engagement with said locking surfaces.

11. In a fastener device of the rotary operative type, a socket unit having a base element adapted to be attached to one of the parts to be fastened, said base element having an aperture and locking surfaces adjacent said aperture on opposed sides thereof, a rotary member having a shank adapted to pass through said aperture in said base element and having lateral projections on opposed sides thereof adapted to engage said locking surfaces on relative rotation of the parts, and resilient wing elements extending toward each other from opposed sides of said base, each of said wings having a broad surface in superposed facing relation to said base and movable relative to said base, each of said wings having a protuberance extending toward said base, each of said protuberances being normally disposed a distance from said respective locking surface which is less than the diameter of said lateral projections, whereby said wings are expanded by movement of said lateral projections between said locking surfaces and said protuberances during rotation of said rotary member, and said wings being contractible to hold said lateral projections in fastener engagement with said locking surfaces.

12. In a fastener device of the rotary operative type, a socket unit having an elongated base element adapted to be secured to one of the parts to be fastened, said base element having an aperture and locking surfaces adjacent said aperture on opposed sides thereof, a rotary member having a shank adapted to pass through said aperture in said base element and having lateral projections on opposed sides thereof adapted to engage said locking surfaces on relative rotation of the parts, and resilient elements integrally joined to the longitudinal sides of said base, said resilient portions extending toward each other in directions normal to the length of said base, each of said resilient portions being movable toward and away from said base and being adapted to cooperate with said rotary member to maintain said lateral projections thereof in fastener engagement with said socket unit.

13. In a fastener device of the rotary operative type, a socket unit having an elongated base, said base having attaching portions adjacent the longitudinal ends thereof, each of said attaching portions having an aperture for receiving a rivet whereby said base is secured to one of the parts to be fastened, said base having a central aperture intermediate said rivet-receiving apertures and locking surfaces adjacent said aperture on opposed sides thereof, a rotary member having a shank adapted to pass through said aperture in said base element and having lateral projections on opposed sides thereof adapted to engage said locking surfaces on relative rotation of the parts, and resilient wing elements integrally joined to the longitudinal sides of said base, said wings extending toward each other in directions normal to the length of said base, each of said wings being movable toward and away from said base and having a cam element facing said base and engageable with one of said lateral projections to maintain said projections of the rotary member in fastener engagement with said locking surfaces.

14. In a fastener device of the rotary operative type, a socket unit having a base element adapted to be attached to one of the parts to be fastened, said base element having an aperture and a locking surface adjacent said aperture, a rotary member having a shank adapted to pass through the aperture in said base element and having a lateral projection adapted to engage said locking surface on relative rotation of the parts, and a single resilient element integrally joined to said base, said resilient element extending in superposed relation to said base and movable relative thereto, said resilient element being adapted to cooperate with said rotary member to maintain said projection in fastener engagement with said socket unit.

15. In a fastener device of the rotary operative type, a socket unit having a base element adapted to be attached to one of the parts to be fastened, said base element having an aperture and locking surfaces on opposed sides of said aperture, a rotary member having a shank adapted to pass through the aperture in said base element, said shank having projections extending from opposite sides adapted to engage said locking surfaces on relative rotation of the parts, and a single resilient element integrally joined to a side of said base, said resilient element extending in superposed relation to said base and movable relative thereto, said resilient element having means cooperable with one only of said projections to maintain said projections in fastener engagement with said socket unit.

16. In a fastener device of the rotary operative type, a socket unit having a base element adapted to be attached to one of the parts to be fastened, said base element having an aperture and locking surfaces on opposed sides of said aperture, a rotary member having a shank adapted to pass through the aperture in said base element, said shank having lateral projections on opposed sides thereof adapted to engage said locking surfaces on relative rotation of the parts, and a single resilient wing element integrally joined to said base element by a bight, said wing having a cam surface in superposed facing relation to said base element and movable relative to said base element, said wing being normally disposed in predetermined relation to said locking surface so as to be expanded by movement of one only of said lateral projections between said locking surface and said cam surface during rotation of said rotary member and thereafter contracting to hold said projection in fastener engagement with said locking surface.

WILLIAM A. BEDFORD, Jr.